US011665992B2

(12) United States Patent
Placella et al.

(10) Patent No.: US 11,665,992 B2
(45) Date of Patent: Jun. 6, 2023

(54) PREDICTIVE AGRICULTURAL MANAGEMENT SYSTEM AND METHOD

(71) Applicant: Root Applied Sciences Inc., Berkeley, CA (US)

(72) Inventors: Sarah Anne Placella, Orinda, CA (US); Adam Ralph Zeilinger, Berkeley, CA (US); Tyler Evan Schartel, Springfield, IL (US); Ken Yamaguchi, Emeryville, CA (US)

(73) Assignee: Root Applied Sciences Inc., Berkeley, CA (US)

( * ) Notice: Subject to any disclaimer, the term of this patent is extended or adjusted under 35 U.S.C. 154(b) by 532 days.

(21) Appl. No.: 16/941,217

(22) Filed: Jul. 28, 2020

(65) Prior Publication Data

US 2021/0029866 A1     Feb. 4, 2021

Related U.S. Application Data

(60) Provisional application No. 62/880,224, filed on Jul. 30, 2019.

(51) Int. Cl.
*A01B 79/00* (2006.01)
*G06N 20/00* (2019.01)
*G06Q 50/02* (2012.01)
*A01B 79/02* (2006.01)

(52) U.S. Cl.
CPC ............ *A01B 79/005* (2013.01); *A01B 79/02* (2013.01); *G06N 20/00* (2019.01); *G06Q 50/02* (2013.01)

(58) Field of Classification Search
CPC ...... A01B 79/005; A01B 79/02; G06N 20/00; G06N 5/01; G06N 20/20; G06Q 50/02; G06Q 10/04

USPC .......................................................... 701/50
See application file for complete search history.

(56) References Cited

U.S. PATENT DOCUMENTS

| | | | | |
|---|---|---|---|---|
| 6,999,877 B1* | 2/2006 | Dyer | ...................... | G06Q 10/00 |
| | | | | 702/5 |
| 2006/0074560 A1* | 4/2006 | Dyer | ...................... | G06Q 10/04 |
| | | | | 702/5 |
| 2012/0284264 A1* | 11/2012 | Lankford | .................. | H04Q 9/02 |
| | | | | 707/736 |
| 2015/0061888 A1* | 3/2015 | Lankford | ............. | A01B 79/005 |
| | | | | 340/870.03 |

(Continued)

*Primary Examiner* — Muhammad Shafi
(74) *Attorney, Agent, or Firm* — FisherBroyles LLP; Kevin D. Jablonski (57) ABSTRACT

Systems and methods for predictive management of plants. Agricultural (and natural resource) managers may have a multitude of data sets and data sources available, but often lack a meaningful or proven way to assimilate all available data and then conclusively select actions. For example, a vineyard manager may be able to collect data about local and regional weather, precipitation, disease prevalence, insect prevalence, pesticide use, crop varietal, cover crop selection and many other inputs to a predictive machine-learning vineyard management engine. As all this data is collected through local devices and third-party services, a prediction model may be used to determine specific outcomes or recommended actions based on the trained predictive model. For example, the model may be used to predict optimal harvest date, disease spread and vector spread, pest spread and impact, best pesticide use, irrigation plans, fruit quality, and the like.

19 Claims, 5 Drawing Sheets

(56) References Cited

U.S. PATENT DOCUMENTS

2017/0032258 A1* 2/2017 Miresmailli ............ G06N 20/00
2018/0322436 A1* 11/2018 Sotiroudas ............. G08C 17/02
2019/0050741 A1* 2/2019 Mewes .................. G06N 20/00

* cited by examiner

PREDICTIVE AGRICULTURAL MANAGEMENT SYSTEM AND METHOD

BACKGROUND

Agricultural ventures throughout the world grow crops for use across several industries. For example, vineyards may grow grapes for use in the wine industry for wineries to produce wines enjoyed by millions the world over. As such, agricultural managers seek to maximize efficiency of land use and crop yield despite many variables. Crop yield and crop efficiency are solid indicators of proper management. To this end, many factors and variables may disproportionately affect crop yield and crop efficiency in different geographic regions. As a result, agricultural managers seek to control as many variables as possible to maximize these measurable outcomes.

The control of highly infectious diseases of plants represents a key challenge in natural resource management and modelling. Mathematical models are playing an increasing role in the design of control as agricultural managers seek to inform their practice with data-based strategies. For example, agricultural managers may assimilate knowledge about local climate, soil data, and other measurable factors to develop specific strategies for managing crops such as irrigation, pesticide use and harvest date. As has been proven time and again, the human mind cannot match computer-based models for ensuring that all collected data is used algorithmically to determine best practices. Further, individual agricultural managers may not be privy to data collectible from other neighboring agricultural proprietors that would assist with making predictions and strategy decisions for crop management.

BRIEF DESCRIPTION OF THE DRAWINGS

The subject matter presented herein will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" as required by 35 U.S.C. § 112.

By way of an overview, systems and methods for predictive agricultural management are discussed. It is understood that the examples and systems discussed herein are generally applicable to any agricultural venture and any level of overall crop and natural resource management, however, the remainder of this discussion will focus on one example of a vineyard that produces grapes as a crop. As alluded to in the background, agricultural managers may have a multitude of data sets and data sources available, but often lack a meaningful or proven way to assimilate all available data and then conclusively select actions based on predictive and historical analysis of the assimilated data. For example, a vineyard manager may be able to collect data about local and regional weather (e.g., precipitation or temperature), disease or insect prevalence, pesticide use, nutrient enrichment, crop varietal, cover crop selection and many other forms of data for input to predictive, machine-learning vineyard methods. As all these data are collected through local devices and third-party services, a prediction model (that may have been previously trained) may be used to determine specific outcomes or recommended actions based on the learned predictive model. For example, the model may be used to predict optimal harvest date, disease spread, pest impact and/or best pesticide use, irrigation plans, fruit quality, and the like.

Once the prediction model is established, several management decisions may be enhanced by utilizing the prediction engine that has been trained through ample sets of historical data. Then, the agricultural management system may interact with several client computing devices (e.g., farmers who may engage an agricultural management service) such that data collected may be aggregated, geo-located, and anonymized to assist with a more comprehensive regional and global agricultural management prediction engine. These and other aspects may be more readily understood and further detailed with respect to the detailed description below with reference to FIGS. 1-5.

Figure 1:
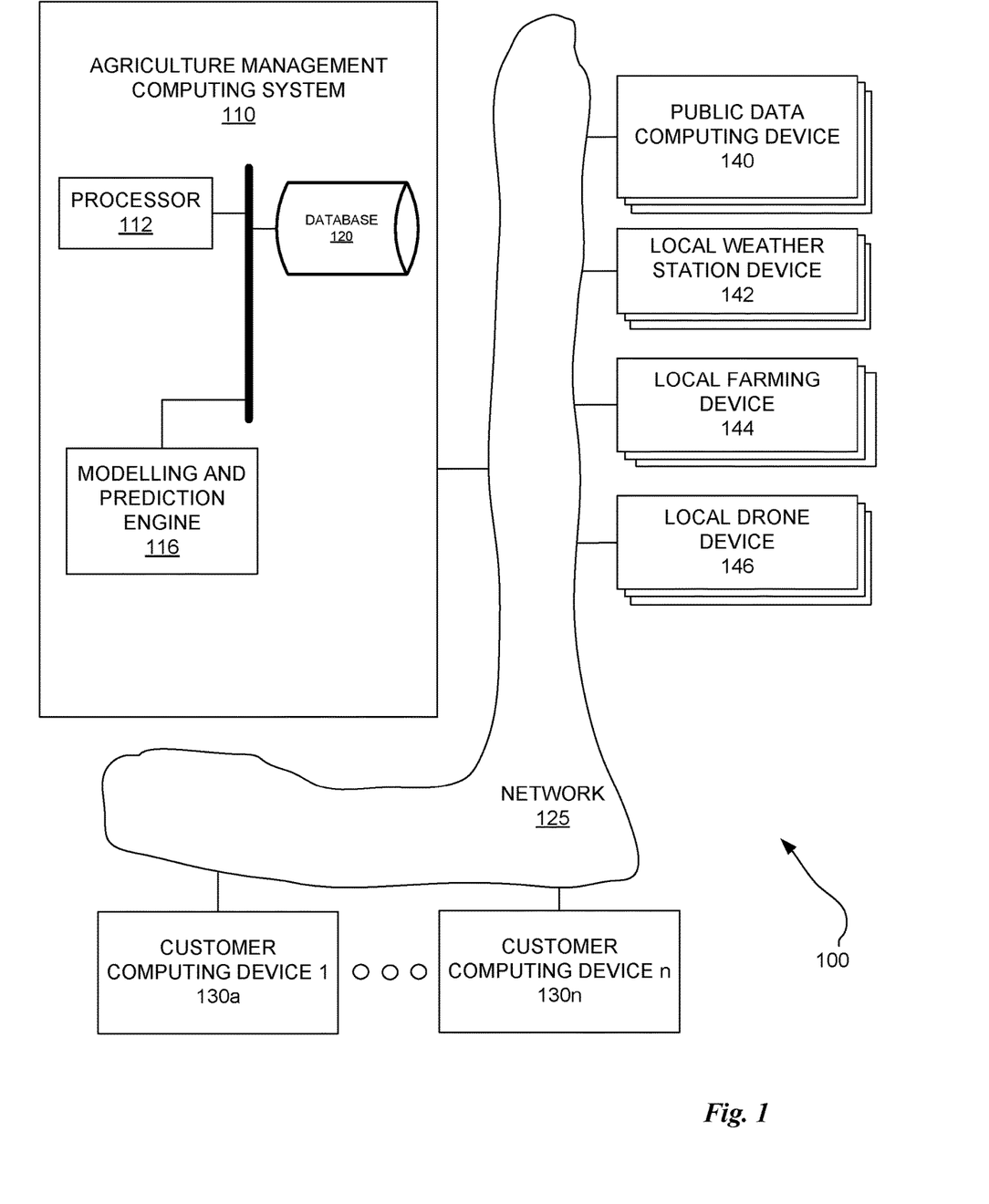
FIG. 1 is a block diagram of a computing environment for realizing the systems and methods of a predictive agricultural management system and method according to an embodiment of the subject matter disclosed herein.

Turning attention to the figures, FIG. 1 is a block diagram of a computing environment 100 for realizing the systems and methods of a predictive agricultural management system and method according to an embodiment of the subject matter disclosed herein. The overall computing environment 100 may be generally comprised of three sets of computing devices that are all communicatively coupled to each other through a computing network 125, such as the Internet, though the network may be a local Intranet or a virtual private network or the like. The three generalized categories of the coupled computers include an agricultural management server computer 110, one or more customer computing-devices 130a-130n, and one or more data-service computing devices, such as local farming-data-collection devices 144, local data-collection drones 146, local weather station devices and public weather station devices 142. Other data-collection and/or data provision services 140 (and related computing devices) are contemplated but not discussed here for brevity. Collectively, these computing devices may be used to receive and send data about one or more croplands that may be stored in a local database 120 and utilized by a modelling and predictive engine 116 under control of a local processor 112 at the agricultural management server computer 110 or under control of a remote processor at a vineyard management server computer 110.

In known manners, many conventionally-available agricultural management tools are simply maps with data where users can add their own data, but these tools do not offer calculation, assimilation, or analysis that would transform the pinned data into a more useful predictive function. That is, no correlative conclusions are drawn and no predictive values are generated. For example, disease data may be collected, but there does not conventionally exist any system for determining where else said disease may present. Utilizing the overall system 100 of FIG. 1, one may utilize all collected data within the modelling and predictive engine 116 to predict specific measures to be taken by an agricultural manager for improving one or more metrics for a crop (e.g., crop yield, optimal harvest date, fruit quality, and the like).

Figure 2:
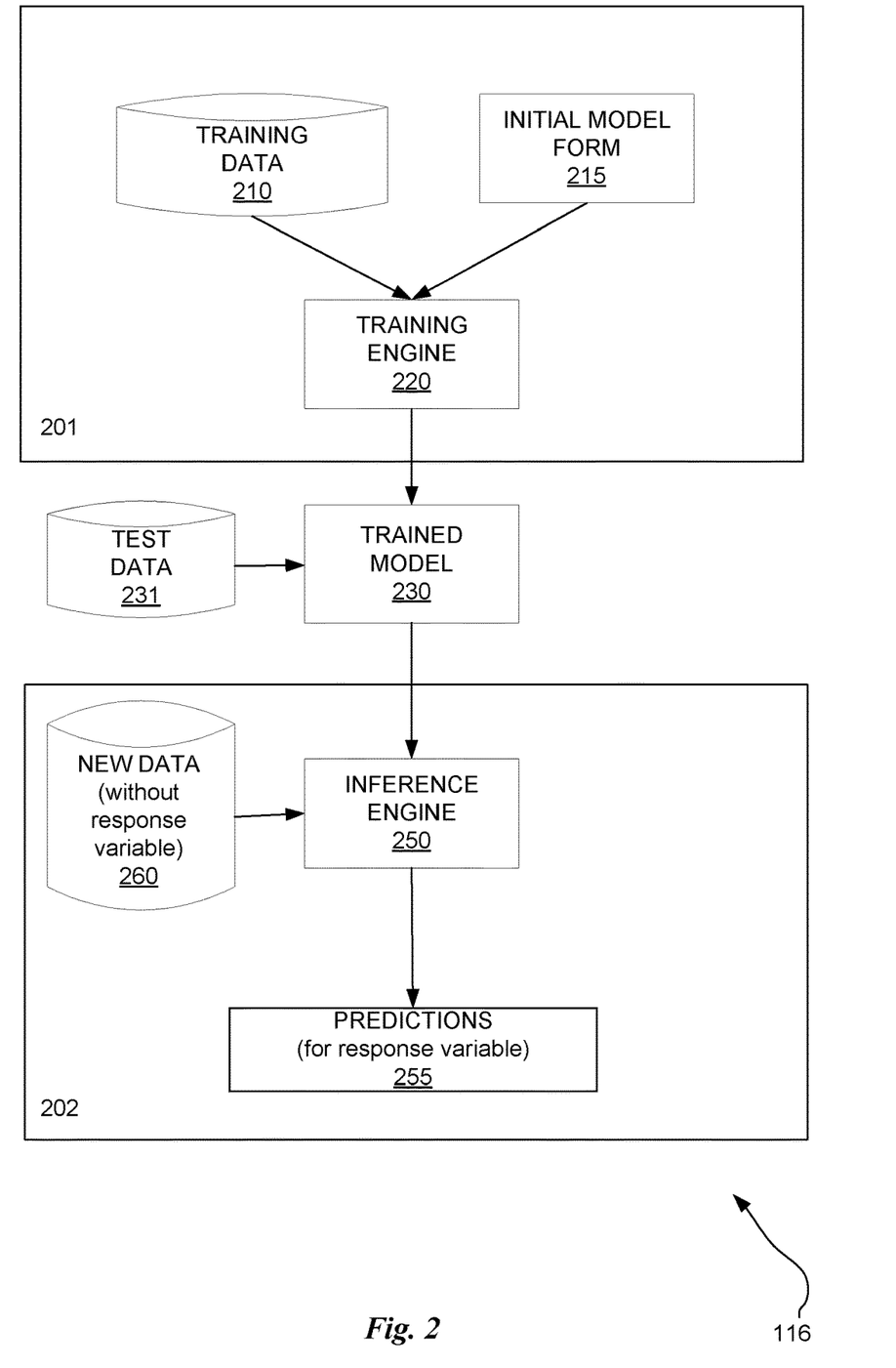
FIG. 2 is a block diagram of a modelling and prediction computing block of the computing environment of FIG. 1 according to an embodiment of the subject matter disclosed herein.

FIG. 2 is a block diagram of a modelling and prediction computing block 116 of the computing environment 100 of FIG. 1 according to an embodiment of the subject matter disclosed herein. In this block diagram, some modules may represent functional activities, such as data collection and training, but this diagram is nevertheless, presented in a block diagram format to convey the functional aspects of the overall modelling and prediction computing block 116. Thus, in FIG. 2, a first aggregated set of functions includes the upper half 201 of the diagram where a predictive model is first established and trained for use in making predictions. Once the trained model 230 is established, the lower half 202 of the block diagram of FIG. 2 focuses on generating initial predictions to be checked against expected or historical data as well as new predictions based on new data collected.

In the upper half 201, training data 210 may be drawn from an established database of agricultural management input data along with an initialized model form 215 to a training engine 220. The training data may include actual collected data from historical records of a local area, of a region, or globally. Further, the training data may be created based on learned judgment of best management practices. Further, the model form may be pre-established using best modeling practices such that the model form includes known influences for, for instance, cropland performance (e.g., influences such as temperature, precipitation, disease trends, pest effect and control, and the like). This model form is simply an initial "best guess" by administrators of the predictive agricultural management system. As the initial training data 210 may also include outcomes and other measurable performance data, a training engine 220 may begin to "train" the model form 215 by identifying specific data correlations and data trends that affect the measurable outcomes from the training data 215. For example, a correlation may be drawn between optimal harvest date (a prediction) and average daily temperature (an input), so long as precipitation/irrigation remains above a threshold value. As all relevant and/or influential correlations are determined by the training engine 220, a trained model 230 is established.

With the trained model 230 established, an inference engine may then utilize the trained model 230 along with newly collected input data for a local area. That is, an agricultural manager may wish to use the system to predict optimal management strategies based on current and previous year collected and assimilated data as well as based on initial predictions using newly collected data. Therefore, the agricultural manager may present new data 260 in the form of local precipitation/irrigation data, local temperature data, local insect and disease data, crop varietal, cover crop selection, and the like. The new data 260 is used by the inference engine 250 that employs use of the trained model 230 to generate one or more predictions 255. In continuing the example from above, the prediction 255 may be an optimal harvest date given the machine-learned trained model 230 and the new data 260 presented.

The types and varieties of data that can be used as inputs to the overall predictive agricultural management system are vast. As a general factor, all collected data may be geo-referenced to a specific geographic location in terms of pinpointed longitude and latitude, local and regional area and globally. The following several paragraphs details aspects of the contemplated inputs to the system.

In a first input, the system may utilize temperature data as gathered locally, regionally or globally, either by local devices or through third-party service data aggregators. For example, average daily temperature, daily highs and lows, and daily temperature trends may be highly influential over several agricultural outcomes and strategies. These data may be collected by third-party services such as government weather services or may be collected locally using local devices such as weather stations and drones.

In a second input, the system may utilize precipitation data as gathered locally, regionally or globally, either by local devices or through third-party service data aggregators. For example, average daily rainfall, daily time-stamped rainfall, and precipitation trends may be highly influential over several agricultural outcomes and strategies. These data may be collected by third-party services such as government weather services or may be collected locally using local devices such as weather stations and drones.

In another input, local and aggregated data about crop infections and diseases may be utilized. Specifically, the system may collect data about disease surveys, disease diagnostics, and disease tests. The data may be geo-referenced and time-stamped so that historical disease data can be assimilated with respect to other geo-referenced and time-stamped data. Further, historical disease and disease vector spread may be collected and utilized.

Delving further into infections and diseases input data, one may further utilize latent infections in addition to symptomatic infections. One may leverage data on which plants have latent (asymptomatic) infections, generated from pathogen diagnostic technology, or other methods. Thus, a latent infections sub-model may be incorporated into a disease spread model. Including this data may result in more biologically realistic models of disease and infection spread. Further, the data may be utilized and modelled to include information on multiple simultaneous infections as plants with multiple infections (have more than one virus) can be more susceptible or show symptoms on a different time scale. Each of these factors may lead to additional data about host-plant amenability to infection as some plants/plant varieties are more or less susceptible to disease vector feeding, subsequent infection(s), and thus disease spread.

Another input that may be used involves data about insects, crop pests and pathogens. Use of trap data (insect, spore or bacteria traps) such as counts, insect/pest species identity, and the like may influence outcomes of the modeling and predictive processes. The trained model may incorporate multiple species into the modelling framework, including multiple insect vectors across local and regional spatial scales. Using trap data may also inform other modelling aspects such as prevalence of infected vectors or vector movement. Thus, several insect factors may be collected including insect abundances, graphic insect data (e.g., pictures of species and size), insect vector occurrence, and insect control strategies.

Delving further into insect and pest control strategies, the collected input data may further include specifics about spraying/insecticide applications. Specific pesticide use may be incorporated into management actions that may influence insect vector abundances/movement, and thus areas where probabilities of new infections or infestations may be affected. Again, all data is geo-referenced and time-stamped so as to correlate with other similarly situated geo-referenced and time-stamped input data.

Another input that may be used involves data about environmental factors, whether static or ephemeral. Examples include: soil type, soil analysis, soil texture, soil nutrients, soil terroir, elevation, aspect, dust prevalence and flow, and weather info. Including these environmental factors in the modelling framework will help identify and characterize which factors are important in crop yield or quality, as well as influencing within-site infection/infestation. These factors may further include crop analysis such as crop varietal, tannins present, fruit quality, blade and petal analysis, and historical crop yield.

Another class of inputs that may be used involves data about genomic, transcriptomic, or proteomic information on plant, insect, bacteria, virus, fungi, or soil microbe presence. These data may include directly relatable data such as nitrogen levels in soils as well as pesticide variety and use and the influence of aspects of any other added products such as fertilizers and cover crops. Plant and viral genomic information could greatly aid in more accurate disease spread models as well as overall crop management predictions.

Another class of inputs that may be used involves data about past management strategies employed. These data may include information about one or more specific management companies used, one or more specific diagnostic or remedial companies used, one or more specific harvesting or treatment companies used, origins of the root stock of a crop, and predictions of habitat suitability.

The above list of inputs that may influence the machine-learning predictive agricultural management models is not exhaustive. However, in the interest of brevity no further inputs are discussed. Attention is now tuned to outcomes and predictions.

As alluded to, the inference engine 250 may be used to generate predicted outcomes based on new data that is entered as well as based on a trained model established previously from training input data. Each of the predictions discussed below may be influenced by one or more inputs as discussed above. Further, myriad algorithms may be developed for one or more predicted outcomes based on weightings given to each of the influential inputs. In general, any set of inputs may have weightings that influence any predicted outcome. The specifics of the algorithms are not discussed with respect to FIG. 2 and are further discussed below with respect to FIG. 4.

In a first prediction, the system may predict crop yield as influenced by a number of inputs including disease presence and disease vector. Crop yield is a measurement of the amount of agricultural production harvested per unit of land area. Crop yield is the measure most often used for croplands and is normally measured in bushels or pounds per acre in the U.S. (metric ton or kilogram per hectare outside the U.S.). The overall predictive agricultural management system utilizes several inputs in generating a prediction for overall crop yield.

In a second prediction, the system may predict fruit quality as influenced by a number of inputs including disease data, temperature data, and precipitation data. Fruit quality may be a relative term as determined by learned professionals in the vineyard, in wine industries, or experienced in management, harvest, or sales of other crops. Generally speaking, fruit quality may be estimated by subjective qualities such as taste, flavor, ripeness, and eventual product quality. The overall predictive agricultural management system utilizes several inputs in generating a prediction for overall fruit quality. Fruit quality may be either interpolated (within spatial scale or location of data) or extrapolated into areas outside of the range of grower/manager-provided data.

In other predictive outputs, specific management actions may be determined and recommended. In a first example of a recommended management strategy, the prediction engine may generate specific recommendations for use of fertilizer or irrigation. Incorporating these management actions may be important in influencing aspects of the modelling framework such as characterization of crop yield or quality. These recommendations may be further influenced by comparing plots (user/grower/manager-identified areas) to understand why such plots may be producing differently. Further, one may use the predictive agricultural management system to analyze data to project which areas will produce well (yield, quality, timing) and provide a map of projected quality and yield or even a recommended variety to plant. This recommendation may use multidimensional principal component or alpha hull analyses that consider environmental factors important to yield/quality to identify other geographic regions with similar conditions, and thus similar expectations concerning yield/quality.

Another predictive outcome that may be generated incorporates varietal value and susceptibility to disease (resistance, tolerance, and the like) with data on disease, geography, soil type, and the like, to optimize projected crop profits. This analysis may include one or more risk factors that are incorporated into the model so that the user can choose how much risk they are willing to tolerate. For example, there may be an optimal solution for profit that could be based on 50% probability of disease making into the less expensive, higher profit crop that would then be compromised. It may be better to choose less risk for a small profit loss, such as 99% confidence/1% risk.

In another prediction, the system may be used to incorporate inputs that can predict varietal growth patterns (how likely it is to do here given a set of environmental parameters) to maximize profits.

In another prediction, the system may be used to incorporate inputs that can predict disease or vector spread as well as disease risk. This prediction may further include recommended actions such as suggestions for which chemicals or biological additions (fertilizers, bugs-in-a-jug, and the like) to be applied for anticipated benefit.

Additional predictions and recommended strategies include, but are not limited to, mapping of habitat suitability, modelling of local areas, regions, and larger land masses, efficacy of management, costs, optimal harvest date and anthocyanin level of harvest, pest control measures and spray optimization, likelihood of crop being contaminated with human pathogens like *E. coli* or *Salmonella*, crop and field rotation, and cover crop selection. This may further include estimating/comparing a data set form a current season with data sets from previous seasons. Further yet, additional data may be assimilated including global data on El Nino/Southern Oscillation (ENSO)—where a cycle is currently and where a cycle has been in the past. Climate predictions may also be incorporated. ENSO indicators may come from research articles, government statements, or other indicators such as Sea Surface Temperatures (SST), Outgoing Longwave Radiation (OLR), Southern Oscillation Index (SOI), Sea Level Anomalies, TAO/Triton Data Display.

Figure 3:
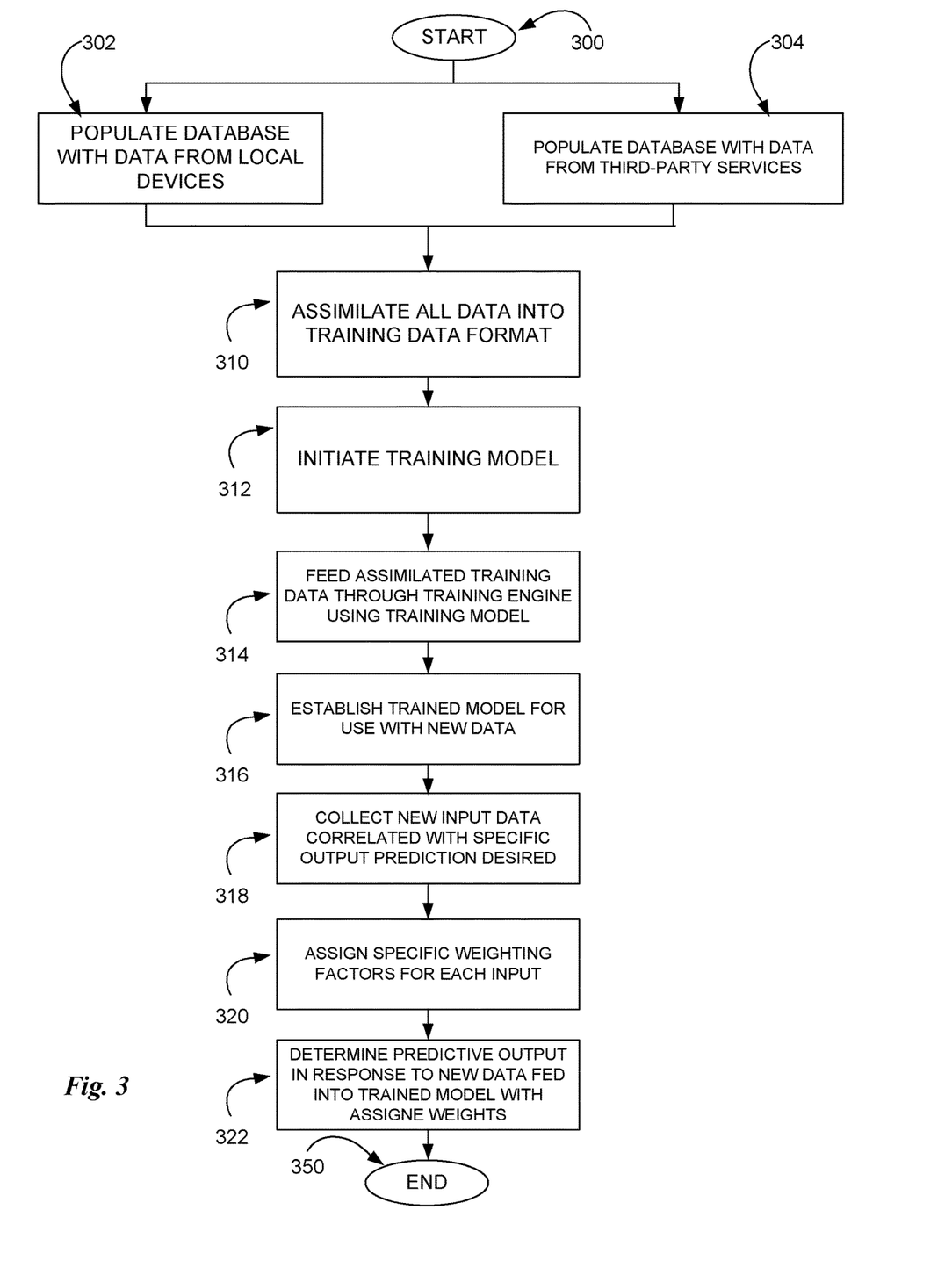
FIG. 3 is a method flow chart illustrating an exemplary computer-based method for establishing a trained prediction model and utilizing the trained prediction model to generate an agricultural management prediction according to an embodiment of the subject matter disclosed herein.

FIG. 3 is a method flow chart illustrating an exemplary computer-based method for establishing a trained prediction model and utilizing the trained prediction model to generate an agricultural management prediction according to an embodiment of the subject matter disclosed herein. The method begins at step 300. Then initial data may be collected contemporaneously at steps 302 and 304 wherein the initial database is populated with data from local devices at step 302 and populated with data from third-party services at step 304. Once collected, this data is assimilated into a training data format at step 310.

At step 312, an initial training model is established with predetermined algorithms that may be further influenced through iterative training via a training engine using the assimilated data. Thus, the assimilated data is used in the training engine with the initialized model at step 314 to begin establishing a trained model. Once a threshold amount of data has been processed in the training engine, a trained model may be ready for use in the overall system at step 316.

Once the trained model is established, one may feed new data into the system to begin the process of establishing one or more predictions at step 318. One may also further influence the trained model by assigning weighting factors to the newly collected data to be used to generate one or more predictions at step 320. Thus, the prediction engine may utilize the newly collected and weighted input data along with the trained model to generate one or more predictions at step 322. Then the method may end at step 350.

Figure 4:
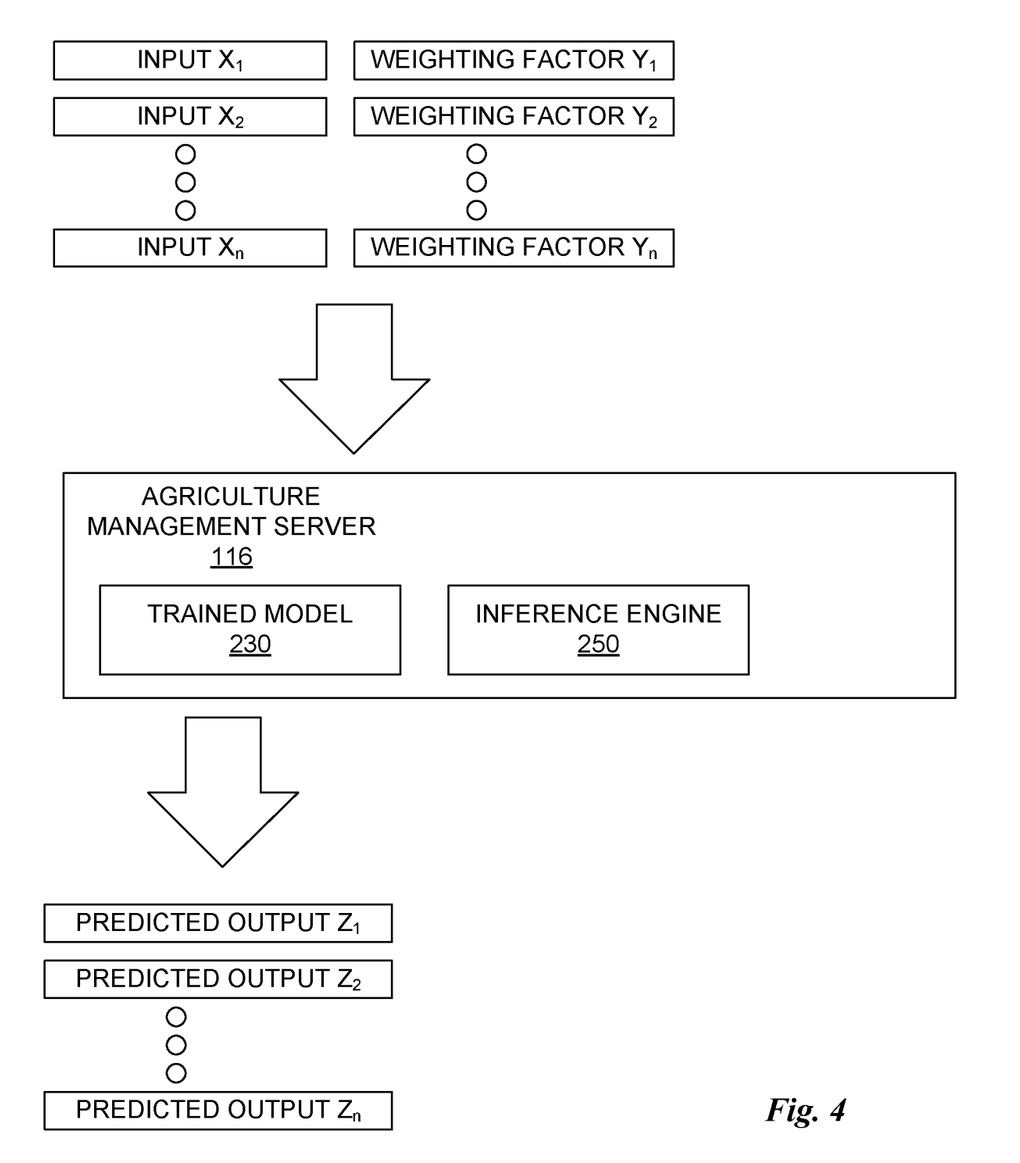
FIG. 4 is a hybrid block diagram and flow chart illustrating inputs, factors and weighting influences for generating a predicted outcome in a predictive agricultural management system of FIG. 1 according to an embodiment of the subject matter disclosed herein.

FIG. 4 is a hybrid block diagram and flow chart illustrating inputs, factors and weighting influences for generating a predicted outcome in a predictive agricultural management system of FIG. 1 according to an embodiment of the subject matter disclosed herein. In general, all inputs that may be used to determine one or more outcomes or predictions are illustrated in a top portion of FIG. 4, while all outcomes and predictions are illustrated in a bottom portion of FIG. 4. FIG. 4 illustrates one or more algorithms that may be realized during the establishment of the trained model 230 whereby the agricultural management server 116 may establish specific predictions $Z_1$-$Z_n$ based on new data through its inference engine 250. That is, given inputs $X_1$-$X_n$, each with corresponding weighting factors $Y_1$-$Y_n$, the inference engine 250 will utilize the trained model to generate predicted outputs $Z_1$-$Z_n$. Generally speaking, the weighting factors may be a result of the prediction process whereby different factors are determined to be more or less influential over the prediction processes. For example, initial weighting factors may be zero as there does not exist any predictive data yet—but as predictions emerge and comparisons to reality are determined, weightings of influential factors may also emerge. These concepts may be better understood with respect to the following non-limiting examples. In a first example algorithm established by the trained model one may predict harvest dates of, for example, a collection of vineyards in northern California. Given a data set with harvest dates from each vineyard of a period of consecutive years, one may use, as inputs, growing degree days, daily rainfall, cumulative solar radiation, and daily vapor water pressure deficit for the previous water year (i.e., October of the previous year to September of the year of harvest). One may group grape varietals by their tendency to mature early, average, or late in the season. One may consider several factors associated with El Nino/Southern Oscillation (Sea Surface Temperatures, Outgoing Longwave Radiation, Southern Oscillation Index, Sea Level Anomalies, TAO/Triton Data Display) to consider the trajectory of this year relative to previous years based on global weather patterns. Thus, one may fit the harvest and climatic data to a series of supervised learning models, including, but not limited to, ridge regression, partial least squares regression, generalized additive, and artificial neural network models to produce an ensemble prediction, with corresponding uncertainty estimates, of future harvest date, given early season climate data and the cultivar. One may also produce a list of years that are most similar to this year and ways in which they are similar and different. This helps winemakers understand what to expect of this season's grapes and plan harvest accordingly.

In a second example algorithm established by the trained model Grape Leafroll Disease (GLD) may be tracked. GLD is caused by the Grape Leafroll Associated Virus Complex (GLRaV) and transmitted by mealybug vectors in the genus *Planoccocus*, results in severe yield loss and management costs in California vineyards. Frequently, vineyard managers collected data sets consisting of repeated censuses of GLD status of each plant in a vineyard over multiple years. At the same time, genomic sequencing, or PCR- or ELISA-based, diagnostic tests provide estimates of the fraction of plants with asymptomatic infections of GLRaV. Using the system described herein, one may fit both the disease census data supplied by the vineyard manager and diagnostic results to a stochastic spatio-temporal Bayesian epidemic model (hereafter referred to as the "epidemic model").

Fitting the epidemic model would produce estimates of parameters relating to 1) secondary or vine-to-vine rates of spread of the pathogen, 2) primary or external infection rates, 3) the dispersal distance of the pathogen, and 4) the rate of symptom development (i.e., the rate at which infected vines progress from asymptomatic infections to disease). These parameters would provide a basic understanding of the epidemiology of GLD in the specific vineyard; they would also provide predictions of which specific vines are likely to be asymptomatically infected in the present and which vines are at greatest risk of infection in the near future. Importantly, the model fit would also give estimates of uncertainty around the parameter estimates and predicted future infection risk, reflecting the quality and quantity of data available. These predictions would then be compared to subsequent (or withheld) data on disease census to test model fit. Once the model fit has been verified, model-based predictions would enable managers to focus management efforts on specific areas or vines within the vineyard with, for example, targeted insecticide applications or removal of diseased, asymptomatic infected, or high-risk vines Furthermore, GLD often reduces the grape yield and quality of vines before slowly causing them to die. From the model-based predictions, one can estimate yield loss as a function of a priori information on GLD effects on specific cultivars, the age of the vineyard, and yield data provided by the manager. One can then simulate the impacts of different management options on both disease-spread and yield loss, providing valuable information for decision making around management options.

Finally, while such disease census data sets are common, not all vineyard managers collect such data, or may have data for only a few years. However, the epidemiological characteristics of GLD should be similar for vineyards in similar climates and of similar cultivars. For a given client/manager, one may leverage model results from neighboring vineyards to provide more powerful analyses and enable predictions of disease spread and yield loss. Such extrapolations may take into account agronomic characteristics such as cultivar and climatic similarities, which will, in turn, be assessed from local weather station data and comparisons of topography. Importantly, model results from different vineyards will not be reported to individual managers/clients, to preserve the privacy of managers.

In a third example algorithm established by the trained model, an algorithm may be established for predicting what to plant and where to expand production to expect similar quality. Using this system one may predict what crops to plant, and where, by considering manager and grower needs, such as crop quality or yield, relative to environmental, climatic, and anthropogenic factors at sites of interest. We use environmental and anthropogenic data inputs from multiple county, state, and federal databases including county and state agricultural commissioner offices, the US Geological Survey (USGS), the US Department of Agriculture (USDA), and the US Department of Transportation. Example data inputs include, but are not limited to, elevation, soil characteristics, land cover, land usage, property boundaries, and roadways. One may use climatic data from several sources such as WorldClim data layers or the PRISM database, as well as county, state, and federal agencies such as the National Oceanic and Atmospheric Association (NOAA). Example data inputs include, but are not limited to, temperature, precipitation, and measures of variability in temperature/precipitation. We use data at multiple spatial and temporal scales.

Further, one may utilize multiple methods to predict what crops to plant and where. Two methods for predicting what crops to plant, and where, are principal component and alphahull analyses. Principal component analyses utilize multiple data sources (e.g., environmental, climatic, and anthropogenic factors) and combine them together to form uncorrelated principal components. These principal components are assembled in an attempt to generate composite variables which explain variation among observations relative to the data inputs considered. Alphahull analyses construct three-dimensional hulls that allow for visualization of multiple important principal components or environmental, climatic, and anthropogenic factors. The degree of overlap among hulls can be used to evaluate similarity/dissimilarity among locales. Other methods for predicting what crops to plant, and where, involve modeling and predicting habitat suitability. Predictions of habitat suitability for crops or locales of interest can be generated via multiple methods including, but not limited to, generalized linear models, generalized additive models, and machine-learning methods such as boosted regression trees, random forests, and artificial neural network-based algorithms. These predictions can then be visualized as maps.

Then, the process may return predictions of what crops to plant and where. These results inform managers and decision-makers about what conditions occur at locations where they already plant crops of interest, as well as how these conditions are related to important aspects such as crop quality or yield. Predictions and maps of habitat suitability also inform managers and decision-makers about if, and where, similar conditions exist. Such information can then be used to prioritize new locations where to plant crops of interest.

In a fourth example algorithm established by the trained model one may compare locales to understand how they are different. One use case is to understand why certain parts of block in a vineyard produce higher quality grapes than the remainder of the block; once differences are understood, management practices can be adjusted by locale within the block to produce more higher quality grapes. For example, one may compare locales and evaluate the extent to which they differ relative to environmental, climatic, and anthropogenic factors. One may use environmental and anthropogenic data inputs from multiple county, state, and federal databases including county and state agricultural commissioner offices, the US Geological Survey (USGS), the US Department of Agriculture (USDA), and the US Department of Transportation. Example data inputs include, but are not limited to, elevation, soil characteristics, land cover, land usage, property boundaries, and roadways. We use climatic data from several sources such as WorldClim data layers or the PRISM database, as well as county, state, and federal agencies such as the National Oceanic and Atmospheric Association (NOAA). Example data inputs include, but are not limited to, temperature, precipitation, and measures of variability in temperature/precipitation. One may use data at multiple spatial and temporal scales.

One may utilize principal component and alphahull analyses to compare locales and evaluate the extent to which they differ relative to environmental, climatic, and anthropogenic factors. Principal component analyses utilize multiple data sources (e.g., environmental, climatic, and anthropogenic factors) and combine them together to form uncorrelated principal components. These principal components are assembled in an attempt to generate composite variables which explain variation among observations relative to the data inputs considered. Alphahull analyses construct three-dimensional hulls that allow for visualization of multiple important principal components or environmental, climatic, and anthropogenic factors. The degree of overlap among hulls can be used to evaluate similarity/dissimilarity among locales.

Further, one may return estimates of, as well as identify which data inputs are important or responsible for generating, similarity/dissimilarity among locales. These results inform managers and decision-makers of potential factors that may influence locale quality for particular crops, as well as identify important factors that influence aspects such as crop quality or yield.

As yet another example algorithm, the system may be used to understand factors associated with a particular condition, such as sugar accumulation disorder (SAD) in grapevines at block level. This algorithm may at first, compile block level incidence. Then, the method may determine the best probability distribution based on these data to use when fitting boosted regression trees. Then, the method may fit trees to data, inspect model results to evaluate optimal number of tree iterations. One may also be sure to consider the potential for complex interactions when fitting trees.

One goal of this analysis is to investigate which variables (or "predictors") best explained variation in the proportion of vines with SAD symptoms. Because proportion of vines with SAD was the response variable, one can transform the data using an arcsine-square-root transformation to make the data approximately normal (emphasis on approximately).

One may first use a boosted regression tree analysis to select the predictors to be included. Including factor variables is difficult in Elastic Net so one may include clone and rootstock, and then split each factor level into a separate binary dummy variable. The result may be 13 predictors total.

Figure 5:
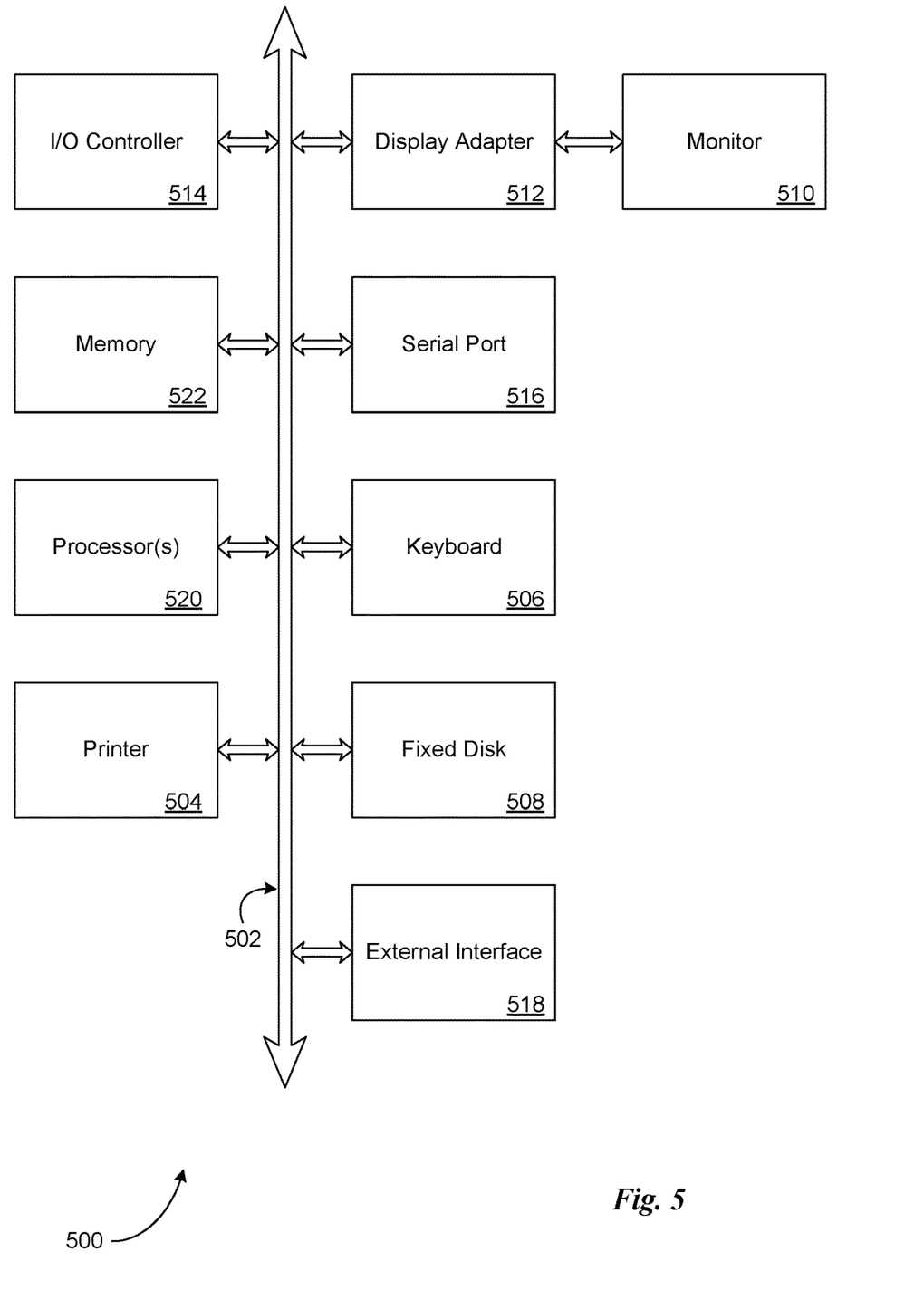
FIG. 5 is a block diagram of a generic computing device for realizing methods leading to predictive agricultural management systems and strategies according to one or more embodiments of the subject matter disclosed herein.

FIG. 5 and the following discussion are intended to provide a brief, general description of a suitable computing environment in which the subject matter disclosed herein may be implemented. Although not required, aspects of the subject matter disclosed herein will be described in the general context of computer-executable instructions, such as program modules, being executed by a personal computer. Generally, program modules include routines, programs, objects, components, data structures, and the like, that perform particular tasks or implement particular abstract data types. Such program module may be embodied in both a transitory and/or a non-transitory computer-readable medium having computer-executable instructions. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that may be linked through a communications network. In a distributed computing environment, program modules may be located in both local and remote memory storage devices.

FIG. 5 is a diagram illustrating elements or components that may be present in a computer device or system 500 configured to implement a method, process, function, or operation in accordance with an embodiment of the information disclosed herein. It may include the system, apparatus, methods, processes, functions, and/or operations for enabling efficient configuration and presentation of a user interface to a user, based on the user's previous behavior, and may be wholly or partially implemented in the form of a set of instructions executed by one or more programmed computer processors, such as a central processing unit (CPU) or microprocessor. Such processors may be incorporated in an apparatus, server, client or other computing or data processing device operated by, or in communication with, other components of the system. FIG. 5 illustrates elements or components that may be present in a computer device or system 500 configured to implement a method, process, function, or operation in accordance with an embodiment. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to additional devices and/or systems not shown in FIG. 5, including a wide area network (such as the Internet), a mouse input device, and/or a scanner. The interconnection via the system bus 502 allows one or more processors 520 to: communicate with each subsystem, control the execution of instructions that may be stored in a system memory 522 and/or the fixed disk 508, and to exchange information between subsystems. The system memory 522 and/or the fixed disk 508 may represent any tangible computer-readable medium.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer-readable medium having stored thereon computer executable instructions that when executed by the processor of a computer control the computer to perform steps. Exemplary computer-readable media suitable for implementing the subject matter described herein include non-transitory computer-readable media, such as disk memory devices, chip memory devices, programmable logic devices, and application-specific integrated circuits. In addition, a computer-readable medium that implements the subject matter described herein may be located on a single device or computing platform or may be distributed across multiple devices or computing platforms.

The system may use a bus 502 that can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The systems and methods herein enable rapid ingestion of big data sets in a distributed computing environment. The metadata-driven approach intake processing reduces source ingestion time, enhances reliability, and automates data intake. Furthermore, the platform agnostic nature of the present disclosure can operate on an input source in any electronic format. The error logging and reporting of the present disclosure further enable users to monitor progress and identify bad data based on predetermined or dynamically generated validation tolerances.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g., data, information, metadata, and the like), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, and the like), an "eBook," an "emagazine," an application or microapplication (as described herein), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system.

As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, and the like) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc., which is read by and written to by the removable storage drive. As will be appreciated, the removable storage unit includes a computer-usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular 30 link, a radio frequency (RF) link, wireless and other communications channels.

The terms "computer program medium" and "computer-usable medium" and "computer-readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware may include components such as application-specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix, MySQL, Interbase, and the like, may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®, JAVASCRIPT, active server pages (ASP) common gateway interface scripts (CGI), extensible markup language (XML), dynamic HTML, cascading style sheets (CSS), AJAX (Asynchronous JAVASCRIPT and XML), helper applications, plug-ins, and the like. A server may include a web service that receives a request from a web server, the request including a URL and an IP address (123.56.555.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on an Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, maps, color-coded data sets, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as R, C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an Internet-based embodiment, an entirely hardware embodiment, or an embodiment combining aspects of the Internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special-purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special-purpose hardware-based computer systems which perform the specified functions or steps, or suitable combinations of special-purpose hardware and computer instructions. Further, illustrations of process flow and the descriptions thereof may make reference to use WINDOWS®, webpages, websites, web forms, prompts, and the like. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", and the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to cat least one of A, B, and C' or cat least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

Since many modifications, variations, and changes in detail can be made to the described preferred embodiments of the subject matter, it is intended that all matters in the foregoing description and shown in the accompanying drawings be interpreted as illustrative and not in a limiting sense. Thus, the scope of the subject matter should be determined by the appended claims and their legal equivalence.

What is claimed is:

1. A computer-implemented method for training a predictive model for crop management comprising:
   collecting a first data set about at least one global agricultural factor from a remote data collection service;
   collecting a second data set about at least one local agricultural factor from a local data collection device;
   assimilating the first and second data sets into a local database to create a first training data set comprising the collected first set of data and the collected second set of data;
   training a predictive model using the first training data set to produce one or more measurable outcomes for the crop;
   collecting a third data set about at least one global vineyard factor from the remote data collection service;
   collecting a fourth data set about at least one local vineyard factor from the local data collection device; and
   predicting a measurable crop outcome using the trained predictive model in response to the collected third data set and the collected fourth data set; wherein the predictive output comprises a mapping one of the group comprised of: a habitat suitability, a suggested varietal to plant, an expected quality of a crop, or a potential plantable crop varietal.

2. The computer-implemented method of claim 1, wherein the first and second data sets are geo-referenced.

3. The computer-implemented method of claim 1, wherein the first data set comprises a disease survey of a geographic region.

4. The computer-implemented method of claim 1, wherein the second set of data comprises tannins or anthocyanins present in samples from a local crop.

5. The computer-implemented method of claim 1, wherein the second data set comprises data about insects present at the local area.

6. The computer-implemented method of claim 1, wherein the second set of data comprises a crop varietal.

7. The computer-implemented method of claim 1, wherein the second set of data comprises a soil analysis of a local area.

8. The computer-implemented method of claim 1, wherein the second set of data comprises pesticide use in a local area.

9. The computer-implemented method of claim 1, wherein the predictive output comprises a crop yield.

10. The computer-implemented method of claim 1, wherein the predictive output comprises fruit quality.

11. The computer-implemented method of claim 1, wherein the predictive output comprises a zone of disease.

12. The computer-implemented method of claim 1, wherein the predictive output comprises an efficacy of management choice against costs.

13. The computer-implemented method of claim 1, wherein the predictive output comprises an optimal harvest date.

14. The computer-implemented method of claim 1, wherein the predictive output comprises a pesticide spray strategy.

15. The computer-implemented method of claim 1, wherein the predictive output comprises a cover crop selection.

16. The computer-implemented method of claim 1, wherein the predictive output comprises a disease risk.

17. The computer-implemented method of claim 1, wherein the predictive output comprises an optimal varietal selection.

18. The computer-implemented method of claim 1, wherein the predictive output comprises an optimal chemical or biological addition to a crop.

19. A computer system for training a predictive model for plant management comprising:
   a first collection device configured to collect a first data set about at least one global plant factor from a remote data collection service;
   a second collection device configured to collect a second data set about at least one local plant factor from a local data collection device; and
   a plant management computing device, including
      a data assimilation engine configured to assimilate the first and second data sets into a local database to create a first training data set comprising the collected first set of data and the collected second set of data;
      a training engine configured to train a predictive model using the first training data set to produce one or more measurable outcomes for the crop; and
      a prediction engine configured to collect a third data set about at least one global vineyard factor from the remote data collection service and collect a fourth data set about at least one local vineyard factor from the local data collection device, the prediction engine further configured to output a prediction in response to analyzing the third and fourth data sets using the predictive model; wherein the predictive output comprises a mapping one of the group comprised of: a habitat suitability, a suggested varietal to plant, an expected quality of a crop, or a potential plantable crop varietal.

* * * * *